(12) United States Patent
Contractor

(10) Patent No.: US 7,120,239 B2
(45) Date of Patent: *Oct. 10, 2006

(54) SYSTEM AND METHOD FOR PROVIDING NO ANSWER DETAIL SERVICE FOR TELEPHONE CALLS THAT ARE NOT COMPLETED

(75) Inventor: Sunil H. Contractor, Marietta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 14 days.

This patent is subject to a terminal disclaimer.

(21) Appl. No.: 10/920,563

(22) Filed: Aug. 17, 2004

(65) Prior Publication Data

US 2005/0013425 A1    Jan. 20, 2005

Related U.S. Application Data

(63) Continuation of application No. 09/846,389, filed on May 2, 2001, now Pat. No. 6,804,341.

(51) Int. Cl.
*H04M 3/42* (2006.01)
*H04M 7/00* (2006.01)

(52) U.S. Cl. .................. 379/207.02; 379/221.08; 379/229

(58) Field of Classification Search ................ 379/207.02–207.05, 207.08, 221.08–221.11, 379/229, 265.02, 265.04, 266.1, 201.12, 379/114.28

See application file for complete search history.

(56) References Cited

U.S. PATENT DOCUMENTS

| | | | | |
|---|---|---|---|---|
| 5,465,286 A | * | 11/1995 | Clare et al. | 379/32.04 |
| 5,896,445 A | * | 4/1999 | Kay et al. | 379/135 |
| 5,903,641 A | * | 5/1999 | Tonisson | 379/265.12 |
| 6,298,123 B1 | * | 10/2001 | Nolting et al. | 379/111 |
| 6,359,976 B1 | * | 3/2002 | Kalyanpur et al. | 379/134 |
| 6,377,567 B1 | * | 4/2002 | Leonard | 370/352 |
| 6,411,681 B1 | * | 6/2002 | Nolting et al. | 379/1.01 |
| 6,504,907 B1 | * | 1/2003 | Farris et al. | 379/35 |
| 6,665,395 B1 | * | 12/2003 | Busey et al. | 379/265.09 |
| 6,744,866 B1 | * | 6/2004 | Nolting et al. | 379/133 |

* cited by examiner

*Primary Examiner*—Benny Quoc Tieu
(74) *Attorney, Agent, or Firm*—Withers & Keys, LLC

(57) ABSTRACT

Call detail service is provided using a trigger that only activates after the disposition of a telephone call is known, for example, a T-Busy and/or a T_NoAnswer. When a telephone call encounters the T-Busy or T_NoAnswer trigger a terminating central office switch attempts to complete the call. If the call is not completed because it is busy or not answered, the information related to the call is sent to a service control point. The service control point creates a call information record. The call information record is sent to a service management system that used the call information record to create a call detail report. Using the T_Busy and/or T_NoAnswer triggers eliminates the need to collect data for every telephone call to determine which calls are not completed because they are not answered or busy. As a result processing complexity and storage requirements are significantly reduced.

20 Claims, 4 Drawing Sheets

SYSTEM AND METHOD FOR PROVIDING NO ANSWER DETAIL SERVICE FOR TELEPHONE CALLS THAT ARE NOT COMPLETED

RELATED APPLICATIONS

This application is a continuation of Applicant Ser. No. 09/846,389, filed on May 2, 2001 now U.S. Pat. No. 6,804,341, and entitled SYSTEM AND METHOD FOR PROVIDING NO ANSWER DETIAL SERVICE FOR TELEPHONY CALLS THAT ARE NOT COMPLETED.

BACKGROUND

1. Field of Invention

The present invention relates generally to the field of provisioning telephone services using the SS7 network. More specifically, the present invention relates to the field of providing reports containing details of telephone calls that are not completed.

2. Background of the Invention

Businesses must be able to assess the quality and efficiency of their operations. Such assessments enable businesses to identify and correct inefficient operations that can result in revenue losses to the business. For example, many businesses derive significant revenue via telephone. As a result, telephone calls to the business that are not completed can have a number of undesirable consequences to the business. For example, potential customers can be missed, existing customers can be lost, questions from suppliers can be missed, changes to appointments and meetings can be missed and service opportunities can be lost. Consequently, it is important for businesses to be able to obtain information regarding telephone calls to the business that are not completed.

Telephone calls do not get completed for a number of reasons. Two of the more common are that the telephone call is not answered or the telephone call is busy. A telephone call is considered not answered if it rings for more than a pre-determined number of rings. A telephone call is busy if the telephone call results in a busy signal, e.g., the called party's telephone is being used, i.e., is busy, and therefore unavailable to answer the telephone call.

Services that provide information regarding the details of telephone calls are generally termed "call detail" services. A prior art call detail service provided details on every call to a business. These details include the disposition of the call, for example, whether the call was answered or not, the duration of the call, the time of the call, whether the call was busy and other information. Using this information, reports are generated that are sent to the business. The business could use the reports to analyze various operations of the business.

One such report is a "Busy" report. The Busy report captures information pertaining to telephone calls that are made to a business but receive a busy signal, i.e., busy telephone calls. This information can be used to determine whether there is sufficient capacity in the business' call center. In addition, the information provides a measure of whether telephone calls are being missed, and if so, how many telephone calls are being missed.

Another report that can be generated is a "NoAnswer" report. The NoAnswer report provides information on calls that are not answered. One use of this report is to obtain information related to telephone calls that arrive after business hours, as well as to determine if telephone calls are made to the business after business hours.

The call detail service of the prior art uses a termination attempt (TAT) trigger or public office dialing plan (PODP) trigger. The TAT or PODP trigger is provisioned on the central office switch that provides telephone service to the business, i.e., the terminating central office switch for calls directed to the business. When a telephone call is made to the business, the call encounters the TAT or PODP trigger provisioned on the business' number. The telephone call is then suspended while the SS7 network responds to the TAT or PODP trigger to determine how to handle the call.

When the call is suspended, the terminating central office switch queries a service control point (SCP) using the SS7 signaling network. The SCP determines how to handle the TAT or PODP trigger. In the case of the call detail service of the prior art, the SCP creates an incoming information record. The incoming information record is a record of information pertaining to the call. The information contains such items as the time of the telephone call, the identification of the calling and called parties. It also included a call identification tag. After the SCP creates the incoming information record, it signals the terminating central switch to complete the telephone call to the business. If the telephone call was suspended by a TAT trigger the telephone call continues. If the call was suspended by a PODP trigger the telephone call is forwarded to another number. The SCP further instructs the terminating central office switch to provide a termination notification when the call terminates, and to provide a disposition of the telephone call.

When the telephone call terminates, whether normally or abnormally, the terminating central office switch sends disposition information related to the call to the SCP. The disposition information contains such information as whether the call was not answered and the duration of the telephone call. The disposition information also includes a call identification tag. The SCP uses the disposition information to create a termination call record.

The SCP sends the incoming information and termination information records to a services management system (SMS). The SMS merges the incoming information and termination information records into a single call information record containing all of the pertinent information relating to the call. The SMS uses the call identification tag to pair incoming information records with their corresponding termination information records.

Finally, the SMS creates reports from the call information record that is sent to the business. The business can use these reports to determine the efficiency of its operations, whether additional facilities are needed, whether certain operators are less efficient than others, whether to extend store hours and other operational details of the business.

One problem with this technique is that it requires two steps for processing. The first step is suspending the telephone call and creating the incoming information record. The second step, which is executed after the call terminates, is creating a termination information record and merging the incoming information record with the termination information record.

Another disadvantage of the prior art call detail service is that it results in a delay in completing the telephone call. The delay results from the telephone call being suspended by the terminating switch while the SS7 network responds to the TAT or PODP trigger to determine how to process the call. This delay occurs whether the telephone call is completed or not.

SUMMARY OF THE INVENTION

The present invention is a call detail service that collects information for only those telephone calls that are not completed. This is done at a point after the disposition of the telephone calls are known. In one embodiment of the present invention, the calls are not completed because they are busy and/or unanswered. Consequently, the present invention eliminates the need to create two records and the required subsequent merging of the two records performed by prior art call detail service systems. As a result, the present invention reduces the amount of processing and storage space required to generate a Busy or NoAnswer report.

The present invention achieves this efficiency by providing a system for generating a report containing details of a telephone call that is not completed. The system includes a single trigger that activates only after a disposition of the telephone call is known. A terminating switch receives the telephone call destined for a called party, wherein the trigger is provisioned on the terminating switch for a telephone line associated with a called party. A service control point receives information related to the telephone call if the telephone call does not complete and creates a call information record containing at least a portion of the information. In addition, the system includes a services management system that receives the call information record and prepares a report to send to the called party based on the call information record. The report includes incoming call information and call disposition information.

In a typical implementation of the present invention, a calling party makes a telephone call to a called party that subscribes to the call detail service of the present invention. A T_Busy and/or a T_NoAnswer trigger is provisioned on the called party's telephone line. A terminating central office switch provides telephone service for telephone calls directed to the called party. The terminating central office switch attempts to complete the telephone call to the called party.

If the telephone call cannot be completed because it is not answered, the T_NoAnswer trigger is activated. When the T_NoAnswer trigger is activated, the terminating central office switch sends information related to the call to a service control point (SCP). The SCP creates a NoAnswer record or file of NoAnswer records and forwards the NoAnswer record to a services management system (SMS). Alternately, the SMS can download the NoAnswer record or a file containing NoAnswer records that have been stored. The SMS creates a NoAnswer report from the information provided in the NoAnswer record or records.

If the telephone call cannot be completed because the called telephone is busy, the T_Busy trigger is activated. When the Busy trigger is activated, the terminating central office switch sends information related to the call to a service control point (SCP). The SCP creates a Busy record and forwards the Busy record to a services management system (SMS). The SMS creates a Busy report from the information provided in the Busy record.

The present invention is described in greater detail in the detailed description of the invention, the appended drawings and the attached claims.

DETAILED DESCRIPTION OF THE PREFERRED EMBODIMENTS

Figure 1:
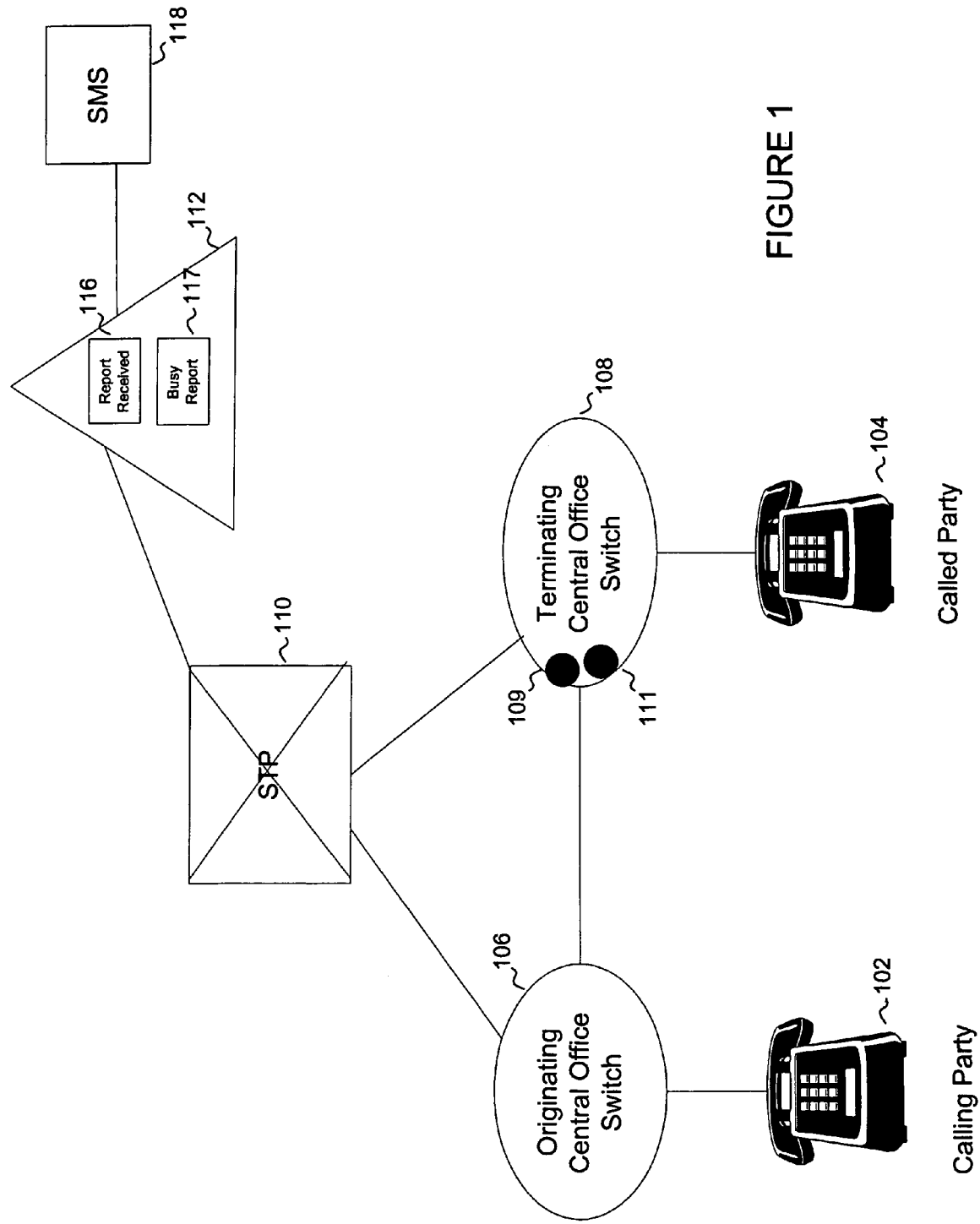
FIG. 1 is a schematic diagram illustrating an telephone system for implementing the present invention.

FIG. 1 is a schematic diagram illustrating an telephone system for implementing the present invention. A calling party 102 places a telephone call to a called party 104. The telephone call is sent from an originating central office switch 106 to a terminating central office switch 108. Originating central office switch 106 provides telephone service to calling party 102. Originating central office switch 106 is also referred to herein as originating switch 106. Terminating switch 108 provides telephone service to called party 104. Terminating switch 108, is also referred to herein as terminating central office switch 108.

When the telephone call is destined for a subscriber of the call detail service of the present invention, the telephone reaches terminating switch 108. A trigger, provisioned on terminating switch 108, only activates after the disposition of the call is known, and only if the telephone call does not complete. In one embodiment of the present invention, the trigger is a T_Busy trigger. In another embodiment of the present invention, the trigger is a T_NoAnswer trigger. In yet another embodiment of the present invention, both the T_Busy and T_NoAnswer triggers are used.

When the telephone call reaches terminating switch 108, terminating switch 108 attempts to complete the telephone call. If the telephone call is completed because it is answered, then no message is sent to the SCP and no data is stored for the telephone call as a result of the T_NoAnswer trigger.

However, if the call is not answered, T_NoAnswer trigger 109 activates. The call is considered not answered if the called party's telephone rings more than a predetermined number of times. When T_NoAnswer 109 trigger activates, terminating switch 108 sends a query to SCP 112 through a signaling transfer point 110. The query comprises information related to the unanswered telephone call including, for example, date and time of the telephone call, status of the telephone call, calling party number, called party number, calling party identification and called party identification.

Using this information, SCP 112 creates a NoAnswer record 116, which comprises the information in the query. NoAnswer record 116 is a call information record that is created in one step rather than two. This is because the T_NoAnswer trigger is activated only if the telephone call is not answered, i.e., after the disposition of the telephone call is known. As a result, it is already known that the telephone call was not answered, and the call information record is created in one step without requiring a merge process. Consequently, the requirement and associated additional processing needed to create two records and merge them is avoided.

NoAnswer record 116 is downloaded to a services management system (SMS) 118. SMS 118 uses the data contained in NoAnswer record 116 to create a NoAnswer report. The NoAnswer report is sent to called party 104. The NoAnswer report can be used for a number of purposes. For example, personnel may need to be trained or replaced if they are not answering calls. Personnel may need to be added if calls are not being answered because there is no additional capacity to answer them. In addition, business hours may need to be extended or an answering service retained if a large number of calls are arriving after hours. Resources may have to be reallocated if calls are placed during business hours but not to agents that are available to answer them. Moreover, interactive voice response capabilities or other queuing technologies can be employed to help alleviate the problem of unanswered telephone calls. Other uses for the NoAnswer report would be apparent to those skilled in the art. One or more of these actions can be taken if the number of unanswered calls exceeds a pre-determined threshold.

If the telephone call is completed because it is not busy, the T_Busy trigger is not activated and no data is stored for the telephone call as a result of the T_Busy trigger. However, if the call is busy, T_Busy trigger 111 activates. A telephone call is busy when the telephone call results in a busy signal, e.g., when the called party's telephone is being used and consequently not available to answer the telephone call. When T_Busy trigger 111 activates, terminating switch 108 sends a query to SCP 112 through a signaling, transfer point 110. The query comprises information related to the unanswered telephone call including, for example, date and time of the telephone call, status of the telephone call, calling party number, called party number, calling party identification and called party identification.

Using this information, SCP 112 creates a Busy record 117, which comprises the information in the query. Busy record 117 is a call information record that is created in one step rather than two. This is because the T_Busy trigger is activated only if the telephone call is not answered. As a result, it is already known that the telephone call was busy, and the call information record is created in one step without requiring a merge process. Consequently, the requirement and associated additional processing to create two records and merge them is avoided.

Busy record 117 is downloaded to a services management system (SMS) 118. SMS 118 uses the data contained in Busy record 117 to create a Busy report. The Busy report is sent to called party 104. The Busy report can be used for a number of purposes. Personnel may need to be added if telephone calls are busy because there is not sufficient capacity to answer them. Resources may have to be reallocated if telephone calls are busy because although agents are available, the ones that are assigned to answer the telephone calls are handling other telephone calls. Moreover, interactive voice response capabilities or other queuing technologies can be employed to help alleviate the problem of busy telephone calls. Other uses for the Busy report would be apparent to those skilled in the art. One or more of these actions can be taken if the number of busy calls exceeds a predetermined threshold.

Figure 2:
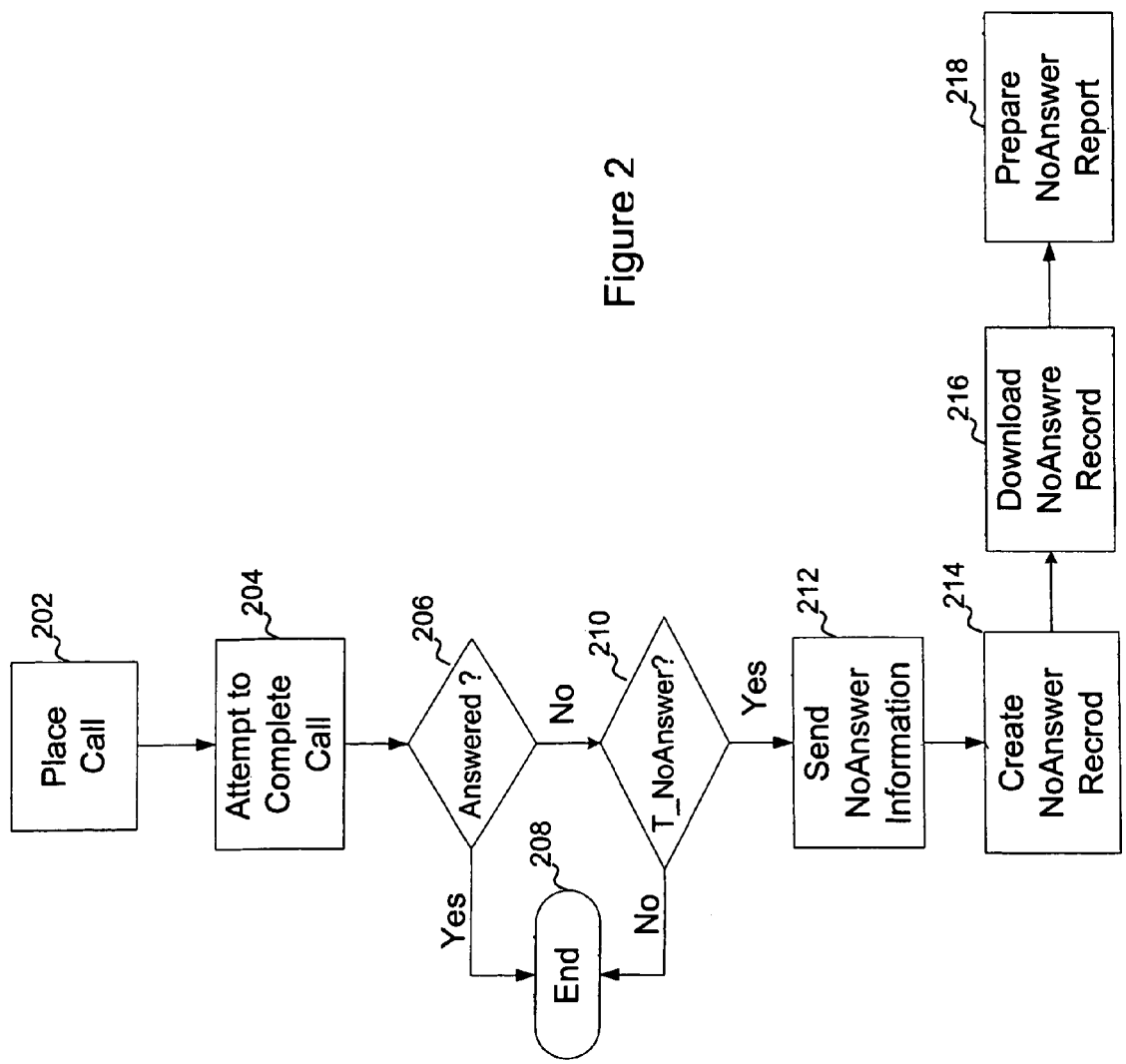
FIG. 2 is a flow chart for a process for generating a NoAnswer report according to an embodiment of the present invention.

FIG. 2 is a flow chart for a process for generating a NoAnswer report according to an embodiment of the present invention. In step 202, a calling party places a telephone call to a called party. In step 204, a terminating switch that services the called party attempts to complete the telephone call to the called party. In step 206, the terminating switch determines if the telephone call is answered. If the telephone call is answered, the process stops in step 208.

If the telephone call is not answered, the process continues in step 210, where it determines whether a T_NoAnswer trigger is provisioned on the called party's telephone number. If a T_NoAnswer trigger is not provisioned on the called party's telephone number, the process ends in step 208.

If a T_NoAnswer trigger is provisioned on the called party's telephone number, the terminating switch sends telephone call information to a service control point (SCP) in step 212. Using the telephone call information, the SCP creates a NoAnswer record in step 214. In step 216, the SCP downloads the NoAnswer record to a services management system (SMS). In step 218, the SMS prepares a NoAnswer report. The NoAnswer report is sent to the called party.

Figure 3:
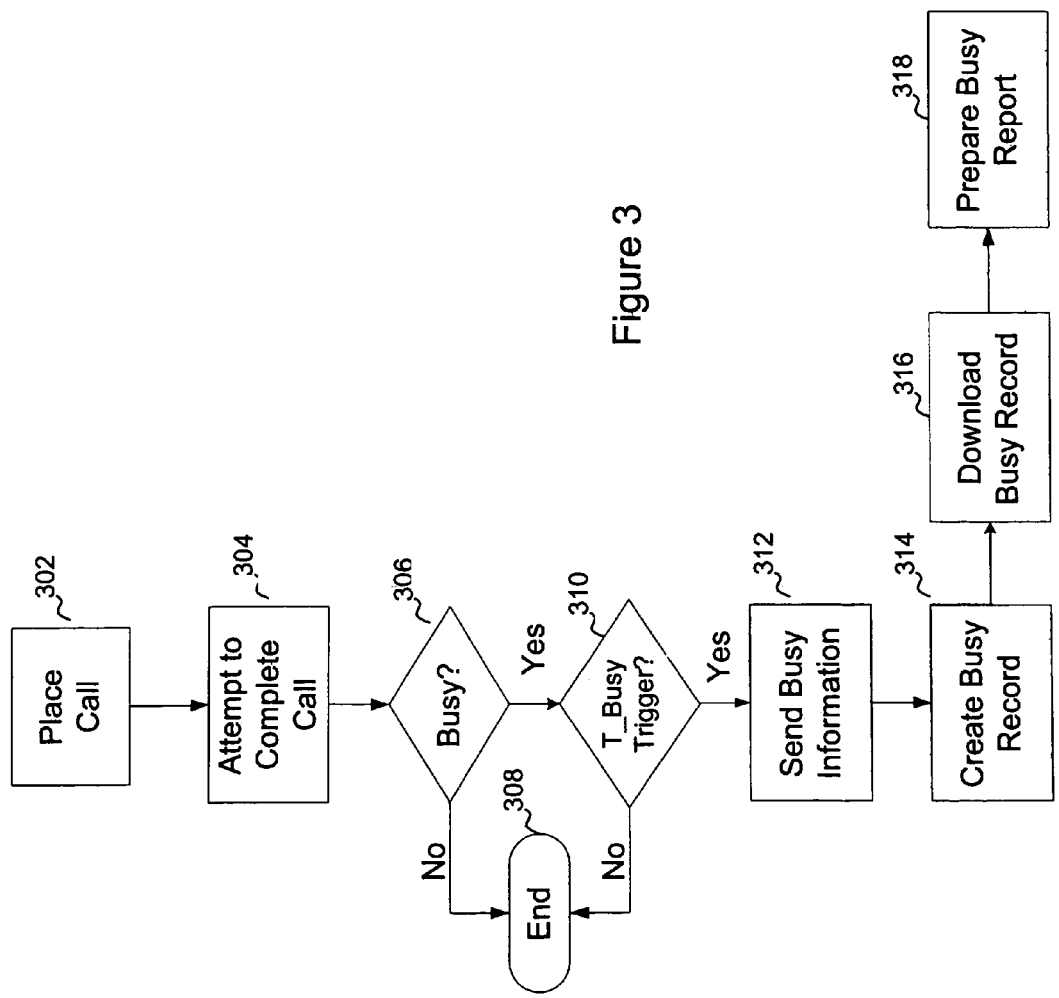
FIG. 3 is a flow chart for a process for generating a Busy report according to an embodiment of the present invention.

FIG. 3 is a flow chart for a process for generating a Busy report according to an embodiment of the present invention. In step 302, a calling party places a telephone call to a called party. In step 304, a terminating switch that services the called party attempts to complete the telephone call to the called party. In step 306, the terminating switch determines if the telephone call is answered. If the telephone call is not busy, the process stops in step 308.

If the telephone call is busy, the process continues in step 310, where it determines whether a T_Busy trigger is provisioned on the called party's telephone number. If a T_Busy trigger is not provisioned on the called party's telephone number, the process ends in step 308.

If a T_Busy trigger is provisioned on the called party's telephone number, the terminating switch sends telephone call information to a service control point (SCP) in step 312. Using the telephone call information, the SCP creates a Busy record in step 314. In step 316, the SCP downloads the Busy record to a services management system (SMS). In step 318, the SMS prepares a Busy report, The Busy report is sent to the called party.

The T_NoAnswer and T_Busy trigger can be provisioned on individual numbers or for groups of numbers. For example, the T_NoAnswer and T-Busy triggers can be provisioned on a telephone number corresponding to a Multi-Line Hunt Group (MLHG). MLHGs are groups of telephone numbers that are accessed by a single telephone number. If one of the telephone numbers in the group is busy, the MLGH searches the remainder of the group until a free line is found. If no free line is found, the calling party hears a busy signal.

In another embodiment of the present invention, the T_NoAnswer and T_Busy triggers are provisioned on the same telephone number. The for the T_NoAnswer and T_Busy triggers can occur in serial or in parallel. When both triggers are provisioned on a telephone line, SMS 118 creates a combined report containing information pertinent to both the T-Busy and T-NoAnswer triggers. In an embodiment of the present invention, the report is processed to remove duplicative information that is provided in response to each of the triggers. In an alternate embodiment, separate reports are generated. Each report contains information related to the trigger to which it is responsive, whether the information is duplicative or not.

Figure 4:
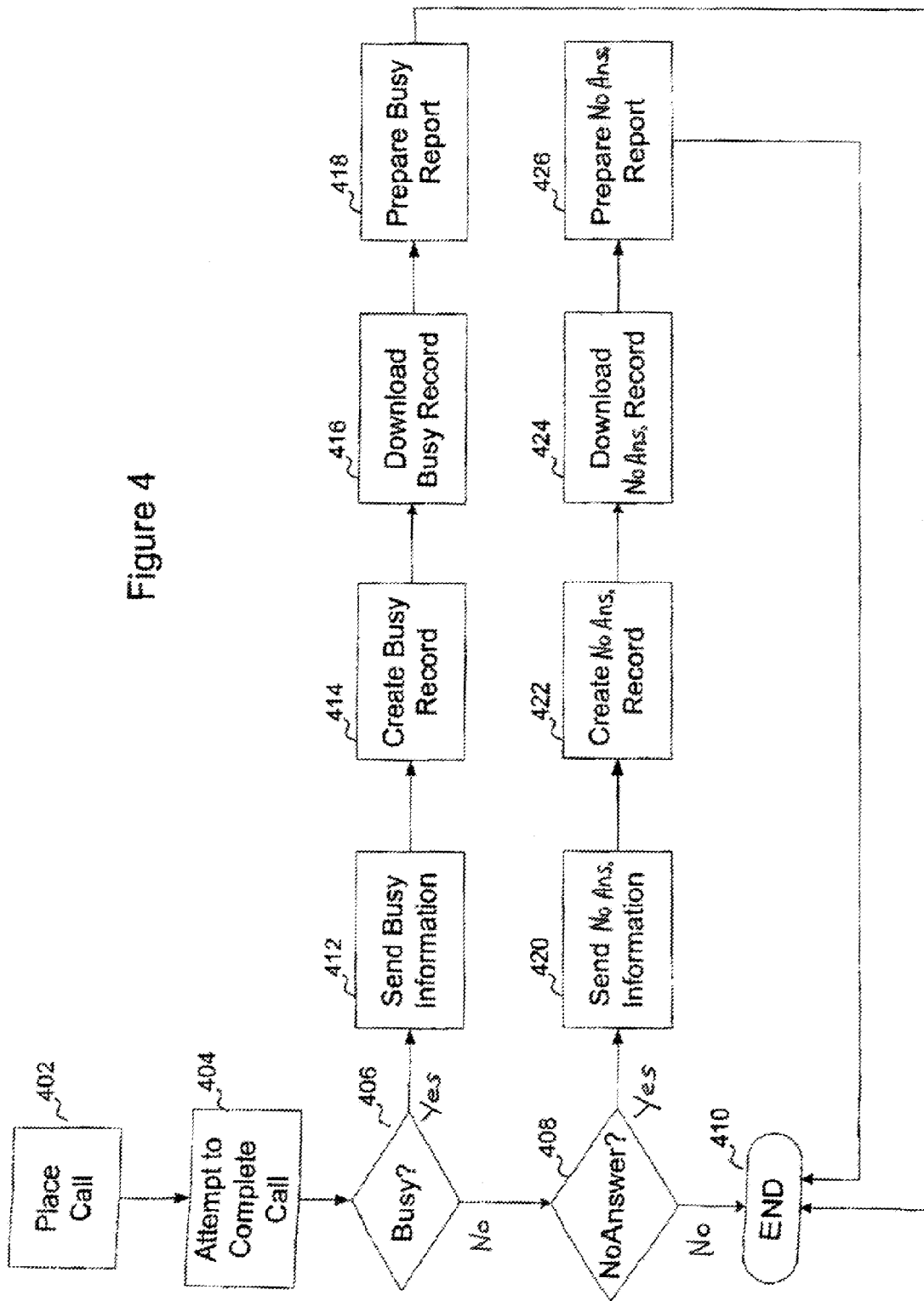
FIG. 4 is a flow chart for a process for generating a Busy report or a NoAnswer report according to an embodiment of the present invention in which both the T_Busy and T_NoAnswer triggers are provisioned on the called party's telephone line.

FIG. 4 is a flow chart for a process for generating a Busy report or a NoAnswer report according to an embodiment of the present invention in which both the T_Busy and T_NoAnswer triggers are provisioned on the called party's telephone line. In step 402, a calling party places a telephone call to a called party. In step 404, a terminating switch that services the called party attempts to complete the telephone call to the called party. The process determines whether the called party's telephone is busy in step 306. If the called party's telephone is not busy, the process continues in step 408, where it determines whether the telephone call has been answered. If the telephone call is answered the process ends in step 410. In this case, the telephone call is completed.

If the process determines in step 306 that the called party's telephone is busy, the terminating switch sends telephone call information to a service control point (SCP) in step 412. Using the telephone call information, the SCP creates a Busy record in step 414. In step 416, the SCP downloads the Busy record to a services management system (SMS). In step 418, the SMS prepares a Busy report. The Busy report is sent to the called party and the process ends in step 410.

If the called party's telephone is not busy but the call is not answered as determined by step 408, the process continues in step 420 in which the terminating switch sends telephone call information to a service control point (SCP). Using the telephone call information, the SCP creates a NoAnswer record in step 422. In step 424, the SCP downloads the NoAnswer record to a services management system (SMS). In step 426, the SMS prepares a NoAnswer report. The NoAnswer report is sent to the called party and the process ends in step 410. It would be apparent to those skilled in the art that the order of the processing the triggers is arbitrary. Thus, in the above example, the T_NoAnswer trigger can be processed prior to the T_Busy trigger.

While the foregoing examples described a wireline voice network, the present invention can be implemented in a wireless network or IP-based network, or any other type of network. It would apparent to those skilled in the art how to implement the present invention in such networks.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of creating a report regarding a telephone call that is not completed within a communications network, comprising:

detecting within the communications network that passes communications to called parties whether the telephone call has been completed, wherein a telephone call is completed when the call is terminated for reasons other than a busy signal being received and other than a called party failing to answer the call after a predetermined number of rings;

upon detecting that the telephone call is not completed, generating a signal that is indicative of the call not completing, wherein the signal is not generated if the telephone call is completed;

in response to the generated signal, creating a record about the telephone call that is not completed; and generating the report regarding the telephone call not being completed based on the record data.

2. The method of claim 1, wherein the communications network is a wireline telephone network.

3. The method of claim 2, wherein detecting that the telephone call is not completed and generating the signal is performed by a terminating switch of a central office.

4. The method of claim 2, wherein the communications network is an IP network.

5. The method of claim 2, wherein the communications network is a wireless network.

6. The method of claim 1, wherein creating the record is performed within a second device of the communications network.

7. The method of claim 6, wherein the communications network is a wire-line telephone network and wherein the second device is a signal control point.

8. The method of claim 1, wherein detecting that the can has not been completed comprises detecting that an amount of time has passed with no answer.

9. The method of claim 1, wherein detecting that the call has not been completed comprises detecting that the called number is busy.

10. A system for generating a report about a telephone call that has not been completed within a communications network, comprising:

a first device within the communications network that completes calls and that generates a signal upon a call not being completed wherein a call is completed when the call is terminated for reasons other than a busy signal being received or a called party failing to answer the call after a predetermined number of rings, wherein further the signal is not generated if the telephone call is completed;

a second device within the communications network that creates a record including data for each of the calls not being completed in response to the generated signal for each call; and a management system that generates a report including the record data about the call that has not been completed.

11. The system of claim 10, wherein the communications network is a wire-line telephone network.

12. The system of claim 11, wherein the first device is a terminating switch of a central office.

13. The system of claim 10, wherein the second device is a signal control point.

14. The system of claim 10, wherein the communications network is an IP network.

15. The system of claim 11, wherein the communications network is a wireless network.

16. The system of claim 10, wherein the first device detects that the call has not been completed by detecting that an amount of time has passed with no answer.

17. The system of claim 10, wherein the first device detects that the call has not been completed by detecting that the called number is busy.

18. A method of determining whether resources for handling incoming telephone calls are adequate, comprising:

upon detecting that one of the telephone calls is not completed, generating a signal that is indicative of the call not completing, wherein a call is not completed when the call is terminated because a busy signal was received or a called party failed to answer the call after a predetermined number of rings, wherein further the signal is not generated if the telephone call is completed;

in response to the generated signal, creating a record including data about the telephone call that is not completed;

from the record for each call of a period, determining a value representing a number of calls not completed for the period; and comparing the value representing the number of calls not completed to a threshold value to determine whether the resources are adequate.

19. The method of claim 18, wherein the value representing the number of calls not completed is a number of busy calls, wherein the threshold value is a busy call maximum, and wherein a determination is made as to whether more telephone lines are needed based on whether the number of busy calls exceeds the threshold value.

20. The method of claim 18, wherein the value representing the number of calls not completed is a number of unanswered calls, wherein the threshold value is an unanswered call maximum, and wherein a determination is made as to whether more people to answer the calls are needed based on whether the number of unanswered calls exceeds the threshold value.

* * * * *